C. F. HOFFMAN.
COOKER ATTACHMENT FOR FURNACE DOORS.
APPLICATION FILED MAR. 12, 1912.
1,035,587.
Patented Aug. 13, 1912.
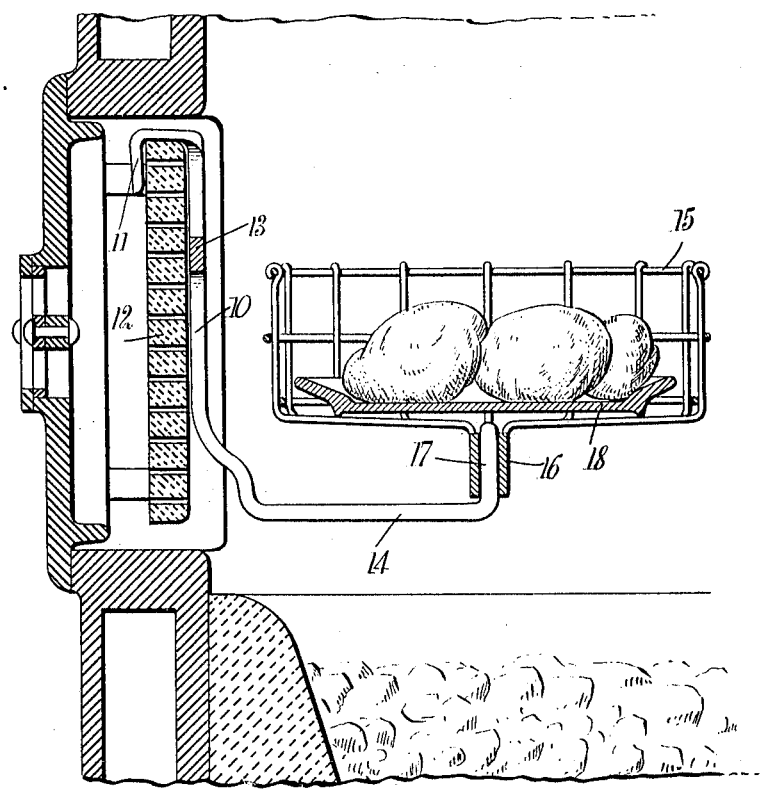
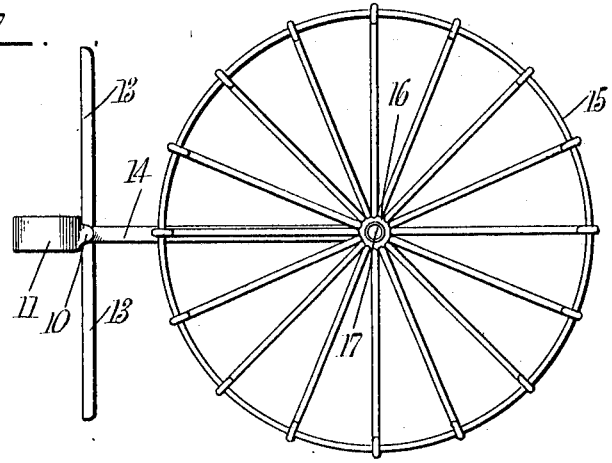
WITNESSES
INVENTOR
Charles F. Hoffman
BY
ATTORNEYS

UNITED STATES PATENT OFFICE.

CHARLES FREMONT HOFFMAN, OF LANSING, MICHIGAN.

COOKER ATTACHMENT FOR FURNACE-DOORS.

1,035,587.  Specification of Letters Patent.  Patented Aug. 13, 1912.

Application filed March 12, 1912. Serial No. 683,354.

*To all whom it may concern:*

Be it known that I, CHARLES F. HOFFMAN, a citizen of the United States, and a resident of Lansing, in the county of Ingham and State of Michigan, have invented a new and Improved Cooker Attachment for Furnace-Doors, of which the following is a full, clear, and exact description.

The object of my invention is to provide a device readily attachable to and detachable from a furnace door, at the inside thereof, so that when the door is closed, a basket or equivalent receptacle forming a part of the device will be supported over the bed of live coals in the furnace, for the baking of potatoes and the cooking of other food.

The invention comprises a hooked shank which preferably has steadying members in the form of lateral arms, the lower end of the shank of the hook being extended in the form of a bracket on which a wire basket or equivalent receptacle is supported, and is adapted to hold potatoes to be baked, or to receive any cooking utensil forming a retainer for any article to be cooked.

By the use of the device food may be readily and conveniently cooked by utilizing the heat of the furnace and thereby saving the cost of other fuel and sparing the inconvenience of a special fire for the purpose.

The invention will be described more specifically in connection with the illustrated example.

Reference is to be had to the accompanying drawings forming a part of this specification, in which similar characters of reference indicate corresponding parts in both the figures.

Figure 1 is a sectional side elevation of a cooker attachment embodying my invention and showing the same applied to the inner face of a furnace door of known form; and Fig. 2 is a detached plan view of the cooker attachment.

In constructing a cooker attachment in accordance with my invention a vertical shank 10 is given a lateral and a return bend to form a downwardly-extending hook 11 adapted to hook over the upper edge of a convenient part of a furnace door at the inside, or into a door part or attachment adapted to receive the hook; the illustrated example shows the hook engaging the refractory facing 12 of a known form of door. The shank is formed with laterally projecting arms 13, that extend from each side of the shank intermediate its length and in the plane of the shank to lie against the inner face of the furnace door and steady the cooker attachment in position, preventing its rocking. At the lower end the shank is extended laterally to form an approximately horizontal bracket arm 14, which supports a holder 15 for receiving the food to be cooked. Desirably this holder is in the form of a wire basket, as shown, and preferably it is formed at the bottom with a central downwardly-extending elongated eye 16 that fits over the vertical spindle forming the outer terminal of the bracket arm 14. With this form the basket may be turned axially, if desired. When vegetables are to be cooked, or eggs, and other articles of food requiring a water container, any suitable cooking utensil may be set into the basket 15. For the purpose of illustration I have shown an ordinary plate 18, set into the basket. In baking potatoes, for example, no container will be required other than the basket 15.

It will be apparent that the device may be readily attached to the door when the latter is in the open position, and as readily detached therefrom when the cooking is done.

Having thus described my invention, I claim as new, and desire to secure by Letters Patent,—

1. A cooker for use on furnace doors, comprising a hanger having a hook to engage a furnace door part, and an approximately vertical shank extending downward from the hook to lie along the face of the furnace door, a bracket arm extending outward from the lower end of the shank and of a length to project over the fire in the fire-box, and a food-holder carried by the said bracket arm and revoluble thereon and adapted to contain the articles of food to be cooked.

2. A cooker attachment for furnace doors, comprising a horizontal bracket terminating at one end in a vertical spindle, the other end of said bracket having an upwardly-extending shank member rising above the spindle and terminating in a return-bend forming a hook to engage a furnace door part, the said upwardly-extending member having a lateral arm projecting at each side in the plane of the shank and the mentioned spindle carrying a wire basket for receiving articles to be cooked, the said basket having a depending central eye fitting over the spindle to turn thereon.

3. A cooker attachment for furnace doors comprising a substantially upright member having a hooked upper portion and lateral steadying arms extending from the said upright member at opposite sides below the hooked portion, a bracket arm on the lower end of the said upright member and below the lateral arms, and the horizontal food holder supported on said bracket arm.

4. A cooker attachment for furnace doors comprising a substantially upright member having a hooked upper portion and lateral steadying arms extending from the said upright member at opposite sides below the hooked portion, a bracket arm on the lower end of the said upright member and below the lateral arms, and a food holder on said bracket arm, said food holder being mounted to turn.

In testimony whereof I have signed my name to this specification in the presence of two subscribing witnesses.

CHARLES FREMONT HOFFMAN.

Witnesses:
JULIA M. BALDWIN,
JOSEPH H. DUNNEBACKE.

---

Copies of this patent may be obtained for five cents each, by addressing the "Commissioner of Patents, Washington, D. C."